(No Model.)
R. O. BINGHAM & B. P. WAGNER.
WAFFLE IRON.
No. 569,444. Patented Oct. 13, 1896.
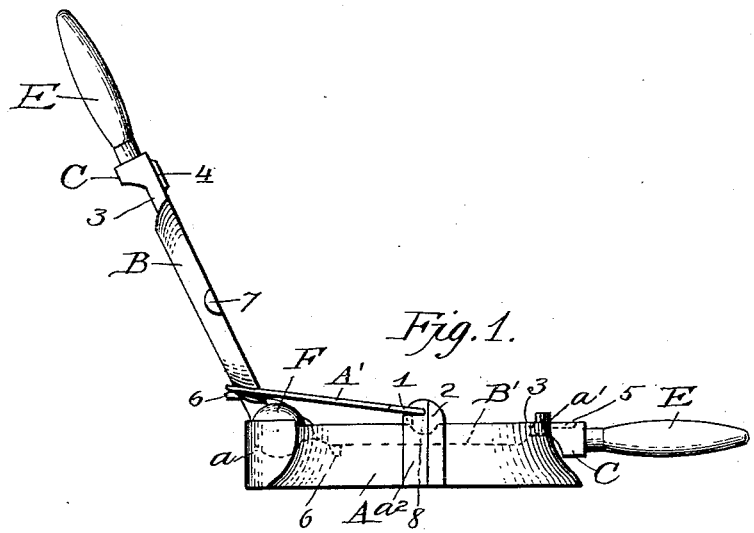
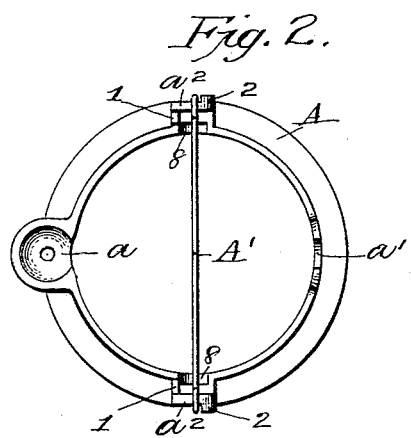
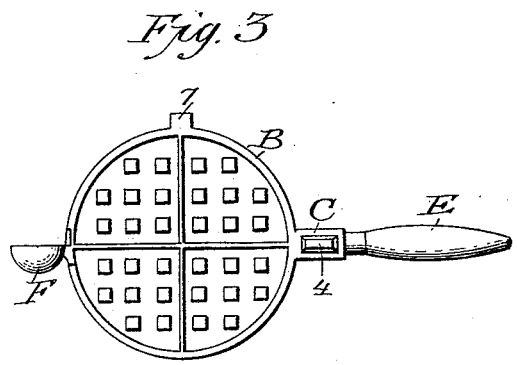
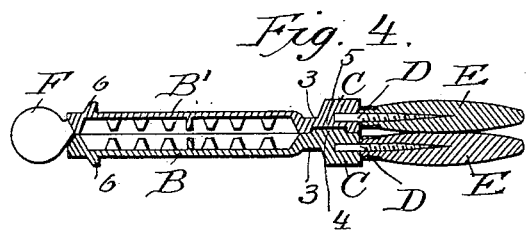
Witnesses:
Albert B. Blackwood.
David W. Gould.
Inventors:
Robert O. Bingham
Bernard P. Wagner
By W. Hunter Myers,
Attorney.

UNITED STATES PATENT OFFICE.

ROBERT O. BINGHAM AND BERNARD P. WAGNER, OF SIDNEY, OHIO, ASSIGNORS TO THE WAGNER MANUFACTURING COMPANY, OF SAME PLACE.

WAFFLE-IRON.

SPECIFICATION forming part of Letters Patent No. 569,444, dated October 13, 1896.

Application filed January 30, 1895. Serial No. 536,668. (No model.)

*To all whom it may concern:*

Be it known that we, ROBERT O. BINGHAM and BERNARD P. WAGNER, citizens of the United States, residing at Sidney, in the county of Shelby and State of Ohio, have invented certain new and useful Improvements in Waffle-Irons, of which the following is a specification, reference being had therein to the accompanying drawings.

Our invention relates to certain improvements in waffle-irons of the kind shown and described in Patent No. 479,731, granted to Robert O. Bingham July 26, 1892.

One distinguishing feature of this invention, as compared with a waffle-iron made in accordance with the patent above alluded to, is the screw-threaded shank on each pan for the reception of a wooden handle, the shanks being so situated that when the handles are in place thereon the latter will lie close to each other when the pans are together, thus affording an easy grasp by the hand of the user.

Another feature consists in a bail attached to the ring, by which the ring and the pans thereon may be lifted together, this bail also serving, in connection with stops on the ring and a stud on each pan, to hold either pan in an elevated position.

Another feature consists in forming an abutment on the handle portion of one pan and a corresponding recess in the handle portion of the other pan, so that when the abutment is in engagement with the recess the pans will be prevented from moving longitudinally or laterally with relation to each other, and dispensing with the pivot-pin heretofore affixed in one part of the ball-joint and adapted to take into a hole formed in the other part, whereby the pan which for the time being is uppermost when both pans are in a horizontal position on the ring can be lifted clear of the other one, while by the former construction the pans had either to be removed from the ring or turned to a vertical position on the ring before they could be taken apart.

The invention will first be described in connection with the accompanying drawings, and then pointed out in the claims.

Figure 1 of the drawings is a side elevation of our improved waffle-iron with one of the pans held in an elevated position. Fig. 2 is a plan view of the ring. Fig. 3 is a plan view of one of the pans, both being of substantially the same construction. Fig. 4 is a vertical section through the pans.

Referring to the drawings, A is the frame, or what is technically called the "ring," for holding the pans, it being designed to rest over one of the holes in the top of a stove or range or on top of a gas or oil stove. In the ring is formed a semispherical depression or socket $a$ for the reception of the ball-joint on the pans, hereinafter described, and diametrically opposite this socket is a recess $a'$, forming a journal-bearing for the handles. On the ring at right angles to socket $a$ and bearing $a'$ are cast ears $a^2$, in which are loosely secured the ends of a wire bail A', the fall of which in the backward direction is limited by stops 1, cast on the ring, the movement of the bail in the forward direction being limited by a shoulder 2 on each ear.

B and B' are the pans, both of which are constructed alike, except as to the abutment and recess, hereinafter described. Each pan is cast with a short solid stem C, half-round at 3, so that when the pans are together on the ring these portions 3 will form a journal. The outer ends of the stems are enlarged, as shown, and from each projects a screw-threaded steel shank D, preferably cast into the stem. These shanks are so positioned in the stems with relation to each other as that when small wooden handles E are screwed thereon the latter will touch each other when the pans are brought together, as shown in Fig. 4. An abutment 4 on one stem takes into a recess 5 in the other stem and holds the pans, when closed, from lateral movement with respect to each other.

Each pan, directly opposite its handle, is formed with a semispherical projection F, the plane of which is at a right angle to the plane of the face of the pan, so that when the pans are brought together these projections F will form, when placed in the socket $a$ in the ring, a ball-joint, permitting the pans to be opened when in a horizontal position by the contacting faces of the semispheres working on each other, this construction also permitting the separation of the pans while in the horizontal position.

On the outer portion of each pan, near the ball-joint, is cast a small stud 6, with which the bail comes in contact when one of the pans is elevated, holding the pan in that position, as seen in Fig. 1, the bail being prevented from falling below a proper position to engage said stud by means of the stops 1 on the ring.

Each pan is provided with the usual trunnion 7, adapted to rest in either of the depressions 8 in the ring, for preventing in the usual manner the tipping of the pans.

It will be observed that while the pans may be revolved in the ring by means of the journals on the stems and the ball-joint, it is not necessary that they be so revolved, as they can be readily turned by lifting the handles and turning the pans on the ball-joint alone, this being a decided advantage when the waffle-iron is used on a gas or oil stove.

Having thus described our invention, what we claim as new, and desire to secure by Letters Patent, is—

1. In a waffle-iron, the combination, with the ring, of the pans journaled in said ring so as to open in a plane at a right angle to their axis of rotation, and each provided with a stud on the outer side, a bail loosely secured in ears cast on the ring, and stops on the ring limiting the backward movement of the bail, whereby when one of the pans is raised the bail is adapted to engage with the stud and hold said pan in an elevated position.

2. A waffle-iron comprising pans each formed with a semispherical projection, the plane of which is at a right angle to the plane of the face of the pan, and a handle-carrying stem opposite said projection, one of said stems having an abutment and the other a corresponding recess, and a ring formed with a semispherical socket for receiving the projections on the pans, whereby when the pans are together on the ring the projections form a ball-joint and the abutment engages with the recess and prevents lateral movement of the pans with relation to each other.

3. A waffle-iron comprising pans each formed with a semispherical projection, the plane of which is at a right angle to the face of the pan, and a journal-stem opposite said projection, said stems being provided with interlocking means and screw-threaded shanks, and handles screwed on said shanks, the shanks being so positioned with relation to each other that when the handles are in place thereon the handles will come together when the pans are closed.

In testimony whereof we affix our signatures in presence of two witnesses.

ROBERT O. BINGHAM.
BERNARD P. WAGNER.

Witnesses:
JOHN F. WILSON,
CHAS. C. HALL.